June 30, 1936. J. H. POWELL ET AL 2,046,131
MECHANISM FOR WELDING CHAIN LINKS
Filed April 30, 1934 3 Sheets-Sheet 1
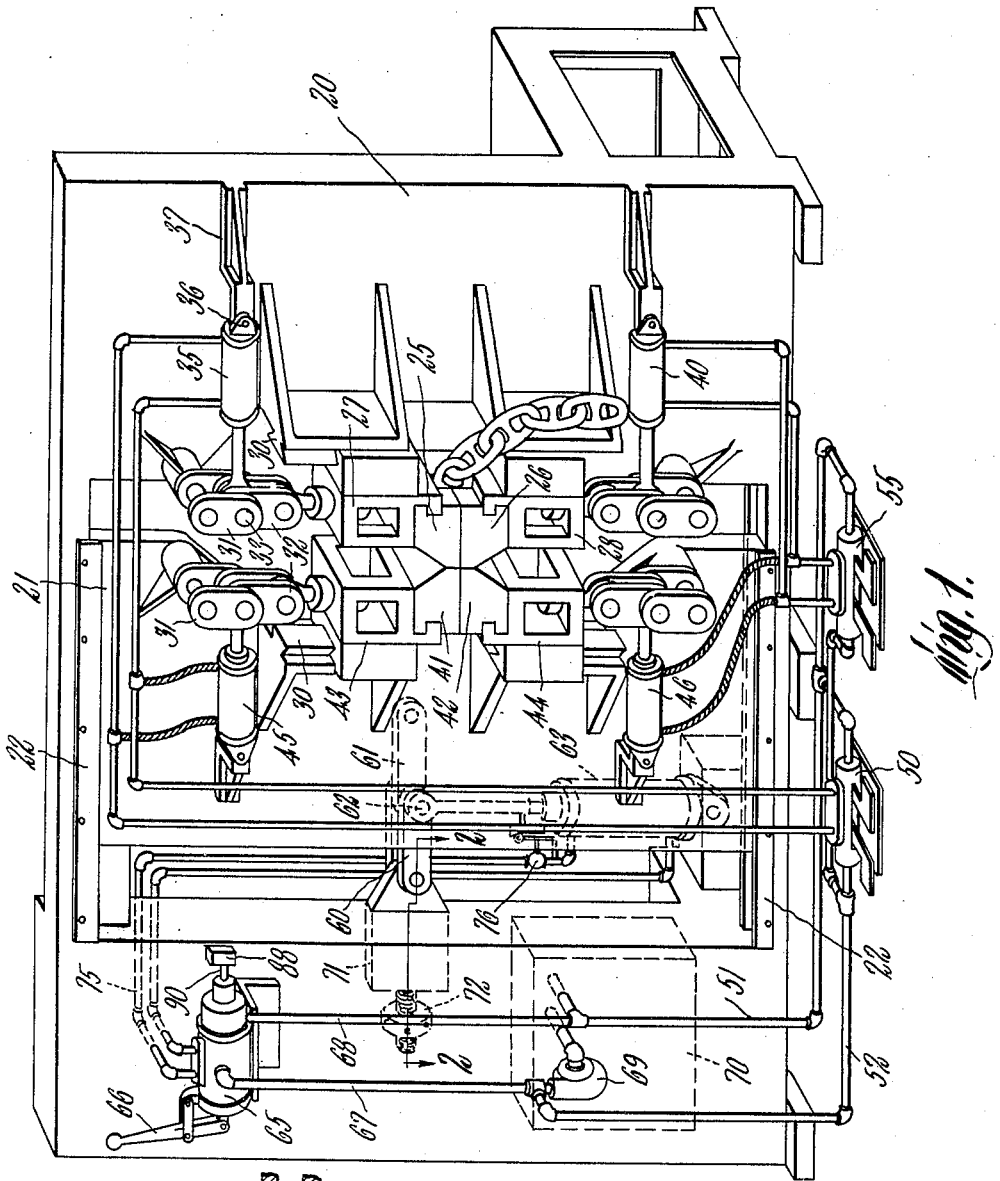
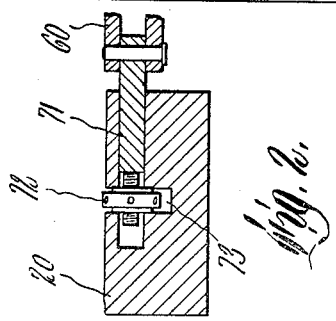
Inventors
John Hillyard Powell
Gilson C. Staats
by Wright, Brown, Quinby May
Attys.

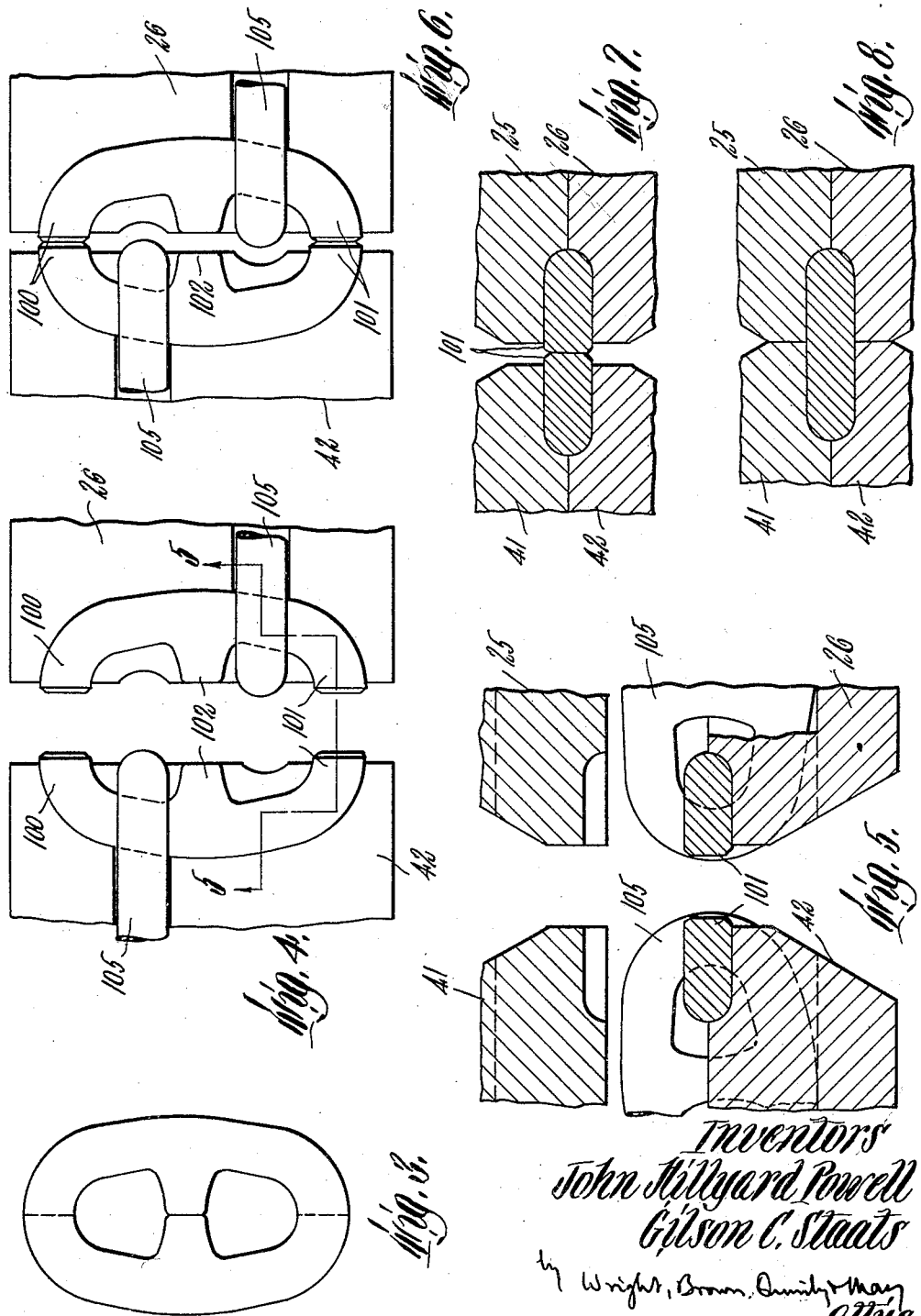

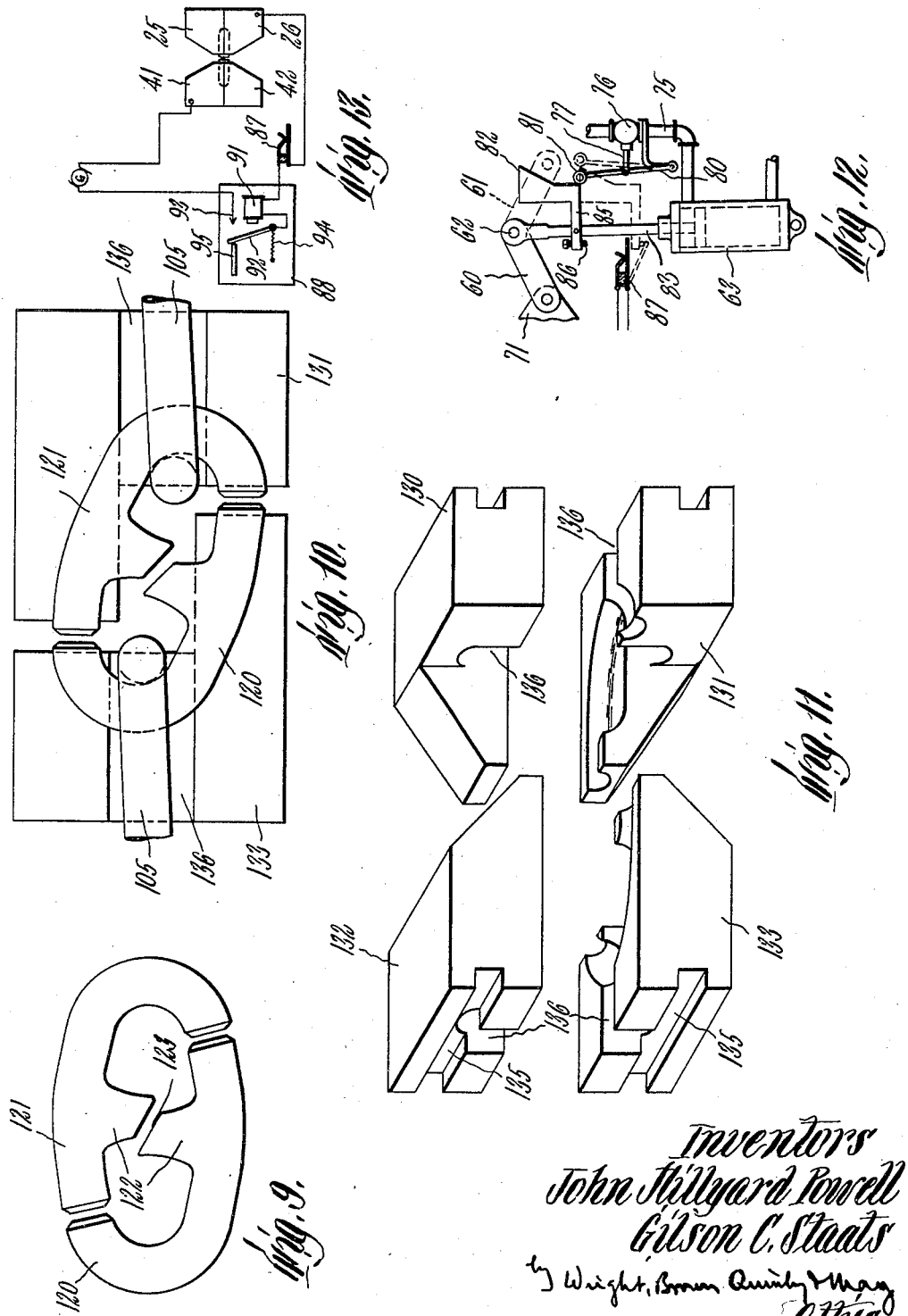

Patented June 30, 1936

2,046,131

UNITED STATES PATENT OFFICE 2,046,131

MECHANISM FOR WELDING CHAIN LINKS

John Hillyard Powell, Chester, and Gilson C. Staats, Folsom, Pa., assignors to Baldt Anchor, Chain & Forge Corporation, Chester, Pa., a corporation of Delaware Application April 30, 1934, Serial No. 723,058

1 Claim.  (Cl. 219—4)

This invention relates to a machine for welding chain links, particularly heavy links such as are used in anchor cables and the like.

It is an object of the invention to weld two-piece links in such a manner as to produce links having not only great tensile strength, but having a high degree of uniformity of breaking strength. It is a further object of the invention to provide mechanism by which such links can be conveniently and efficiently welded.

According to the invention, the links to be welded are made in two separate pieces which, when welded together, make a complete link. The ends of the pieces which are to be joined are made with extra material which may be discharged from the weld during the initial period of the welding operation. In welding together such link parts, the ends are brought into contact with sufficient electrical voltage thereon to produce a flash weld. During the initial period of the flash welding operation, the surface layers of the contacting portions are discharged laterally from the electric arc. Throughout the duration of the welding arc, the two link parts are slowly and steadily advanced toward each other while the temperature of the metal adjacent to the contacting end surfaces rapidly rises to suitable welding temperature. At a predetermined moment when the temperature has reached the welding point, the electric current is cut off, but the movement of the two link parts toward each other is continued under heavy pressure so that the metal at the weld is highly compressed during the initial cooling period. This results in the elimination of faults and imperfections in the metal at the point of weld, and results in a uniformity of tensile strength in the links thus produced.

For a more complete understanding of the invention, reference may be had to the embodiments thereof which are hereinafter described and which are illustrated on the drawings, of which Figure 1 is a perspective view of apparatus embodying the invention.

Figure 2 is a section on the line 2—2 of Figure 1.

Figure 3 is a plan view of a completed chain link made in accordance with the invention.

Figure 4 is a fragmentary plan view of a pair of die members containing link parts to be welded together.

Figure 5 is a sectional view on the line 5—5 of Figure 4.

Figure 6 is a plan view of the die members and link parts shown in Figure 4, the parts being moved together so as to bring the ends of the link parts into contact.

Figure 7 is a fragmentary sectional view of the link shown in Figure 6, and the die members holding the same.

Figure 8 is a sectional view similar to Figure 7, except that the members are shown in a different position.

Figure 9 is a plan view of another form of two-part link.

Figure 10 is a plan view of die members with links similar to those shown in Figure 9.

Figure 11 is a perspective view of a set of die members adapted to hold link parts such as are illustrated in Figure 9.

Figure 12 is an elevation of automatic mechanism employed in the machine shown in Figure 1.

Figure 13 is a wiring diagram of the welding circuit.

The welding machine consists primarily of a fixed frame 20 on which is mounted a movable frame 21. These frames may be set up in any convenient position. As shown on the drawings, the frames 20 and 21 may comprise vertical plates, one of which is stationary, the other being slidable in its plane. Suitable guide members 22 may be provided for the movable frame 21. On each of these frames is mounted a pair of die members adapted to clamp and hold a half-link to be welded to a corresponding half-link held by a cooperating pair of die members mounted on the other frame. As shown, the fixed frame 20 carries an upper die member 25 and a lower die member 26. These are removably mounted on respective carriers 27 and 28 which are adapted to reciprocate vertically dovetailed guides 30 being provided to maintain the carriers and their die members in accurate vertical alinement. The upper carrier 27 with its die member 25 is vertically reciprocable by any suitable mechanism for the purpose, a toggle mechanism being shown in Figure 1. This mechanism consists of toggle links 31 and 32 hinged together as at 33. The toggle is operated by a fluid motor 35 consisting of a cylinder containing a power piston connected directly to the pivot pin 33, the motor 35 being preferably hinged as at 36 to a suitable bracket 37 on the frame 20. A precisely similar toggle structure may be mounted on the frame 20, as shown, to reciprocate vertically the lower carrier 28 and its die member 26, this lower toggle mechanism being actuated by a fluid motor 40.

In like manner, a pair of die members 41 and 42 may be removably mounted on respective carriers 43 and 44, the latter being slidably supported on the movable frame 21. These die members and their carriers may be operated by toggle mechanism similar to that employed for the die members 25 and 26, the upper die member 41 being actuated by a fluid motor 45, the lower die member 42 being actuated by a fluid motor 46. These die members are adapted to clamp and hold firmly a pair of half-links which are to be welded together, each half-link having hooked thereon a whole link which is to be the adjacent link in the completed chain. Thus, the invention may be practiced by welding every alternate link in a chain cable, the welded links being used to link together alternate preformed links. The motors 35 and 45, which operate the upper die members 25 and 41, may be controlled by a suitable valve 50, connected to supply and discharge pipes 51 and 52, such valves being well known in the art. Similarly the motors 40 and 46, which operate the lower die members 26 and 42, may be connected to a similar control valve 55 so that they can be raised or lowered in unison by the operation of the valve.

As shown, the movable frame 21 is in the form of a vertically positioned panel which is slidable in suitable guides 22 on the fixed frame 20. The motion of the frame 21 is such as to bring the die members 41 and 42, with the half-link held thereby, toward the die members 25 and 26. This approaching movement, and a reverse receding movement of the frame 21, may be brought about by any suitable apparatus such as the toggle mechanism illustrated in Figure 1. As shown, this consists of a pair of toggle links 60, 61 pivoted together as at 62, a motor 63 being provided to actuate the toggle. This motor may be controlled by a suitable hydraulic valve 65 having an operating lever 66. The valve 65 is of any suitable structure well known in the art and is connected by supply and discharge pipes 67 and 68 to a pump 69 or source of fluid under pressure and a return reservoir 70. The toggle link 61 is attached directly to the movable frame 21, the toggle link 60 being attached to an adjustable lug 71, the position of which may be adjusted as by a nut 72 which is seated in a transverse slot 73 in a portion of the fixed frame 20. Thus the extreme limit of approach of the movable die members 41, 42 may be adjusted.

Extending from the control valve 65 to the fluid motor 63 is a supply pipe 75 containing an auxiliary valve 76. As shown conveniently in Figure 12, this auxiliary valve is adapted to be operated automatically when the piston in the motor 63 has reached a predetermined point in its travel, that is, when the movable frame 21 has reached a predetermined point in its approaching movement. The auxiliary valve 76 is normally in a partly opened position, this position being indicated in Figure 12. The valve stem 77 is connected to a rockable lever 80 having a cam follower 81 thereon which rides on a suitable cam 82. This cam is mounted on the piston rod 83 of the motor 63. When the operation of the motor 63 causes the cam 82 to descend, the cam follower 81 rides on the cam surface and opens the valve 76 fully so that the full force of the fluid pressure is brought to bear on the piston of the motor 63 during the last part of its travel.

The cam member 82 may also be provided with a projecting lug 85 having an adjustable screw 86 adapted to engage and open an electric switch conventionally shown at 87, this switch being connected in series in the welding circuit. Also in the welding circuit is a switch 88 which may be of the well known "push button" type. For the actuation of this switch, the hydraulic control valve 65 may be constructed with a projecting plunger 90 adapted to punch the button of the switch 88 when the control handle 66 is rocked to open the valve 65 for the approaching movement of the movable frame 21. Thus, when the approaching movement of the frame 21 is started, the control switch 88 is closed so that the welding circuit is ready to be completed by mutual contact of the opposing end faces of the half-links held by the die members. The switch 88, as indicated in Figure 13, is preferably of the type which is magnetically held closed as long as the circuit therethrough is complete. As conventionally shown, the switch may have a magnet 91 adapted to hold the switch blade 92 against the contact point 93 as long as current is flowing through the circuit. If the circuit is broken, the blade 92 is pulled away from the contact 93 as by a spring 94. A plunger 95 may be employed to close the switch by pushing the blade 92 against the contact 93. In the apparatus illustrated, the outer end of the plunger 95 is adapted to be engaged by the projecting plunger 90 of the hydraulic valve 65 so as to close the switch 88 and to hold it in closed position as long as the valve 65 is opened.

Figures 3, 4 and 6 illustrate a two-piece chain link which may be welded together, according to the invention, to form a complete link. As shown, each half-link may be in the form of an E, the upper and lower end portions 100 and 101 extending beyond the middle projection 102, so that, when the opposing half-links are brought together, the end projections come into contact before the opposing middle portions 102. Thus the welding occurs at the ends of the link and not in the middle. The amount of projection of the end portions 100 and 101 is predetermined so that the final approaching movement of the half-links, which presses together strongly the weld portions while still at or near welding temperature, brings the opposed middle projections 102 into abutting contact so that together they constitute the stud for the link. The die members 25, 26, 41 and 42 each consists of a metal block having suitable recesses or channels therein to receive a half-link as described, each die member being also provided with a suitable transverse recess to receive loosely the end portion of a link 105 which is hooked onto one of the half-links to be welded. Thus the whole links 105 can be disposed with respect to the half-links to be welded, as indicated in Figures 4 and 6.

A different form of half-link is illustrated in Figure 9. As therein shown, the whole link is composed of two half-links 120, 121, each of which has a long leg, a short leg and a stud portion 122. The end face 123 of each stud portion is at an angle of 45° or so with the axis of the finished link, so that, during the welding operation, the opposing faces 125 are suitably separated and do not come into mutual contact until after the welding circuit has been broken.

Suitable die members 130, 131, 132, 133 may be employed for half-links of the kind shown in Figure 9. Each die member is provided with a slot 135 in its rear wall to cooperate with one of the carriers 27, 28, 43 or 44, as shown in Figure 1. The die members illustrated in Figure 11 are also provided with transverse channels 136 to accommodate the whole links 105 which are hooked onto the half-links prior to the welding operation, as indicated in Figure 10.

In operating the mechanism, the control valves 50 and 55 are operated to retract the upper and lower die members from each other as far as possible so as to permit the insertion of half-links on each of which have been hooked a whole link. When the half-links have been properly positioned in the lower die members, the upper and lower die members are caused to approach each other so as to clamp the respective half-links between them through the operation of the toggle mechanisms actuated by the motors 35, 40, 45 and 46. At this time, the movable frame 21 is in its retracted position toward the left. When the half-links are properly gripped by the die members, the valve handle 66 may be swung to the left so as to open the valve 65 and at the same time to close the electric switch 88 in the welding circuit. This puts suitable voltage on the die members and the half-links held thereby. The opening of the valve 65 admits a relatively slow flow of power fluid into the motor 63 through the partly opened auxiliary valve 76. This slow movement of the frame 21 continues until the projecting end portions of the half-links come into contact.

When the end portions of the half-links come into contact as shown in Figure 7, a heavy electrical current is set up which, owing to the poor conductivity at the point of contact, sets up instantly a strong heating effect which quickly raises the temperature of the metal at the contact points to the melting point. The current also arcs across the narrow gap separating opposing surfaces of the ends of the half-links which are not quite in contact, these arcs aiding in the heating effect. The highly heated gases in the arcs also tend to expel bits of molten metal from the contacting surfaces so that a clean strong weld ultimately results. During the period immediately following the closing of the welding circuit by contact between the ends of the half-links, the approaching movement of the half-links toward each other is slowly and steadily maintained. After sufficient time has elapsed to permit the metal immediately adjacent to the contacting end faces of the half links to reach suitable welding temperature, the welding current is automatically cut off by the opening of the switch 87. At the same time, the auxiliary valve 76 is opened by the cam 82 to hasten the final movement of the piston in the motor 63 and to exert on the piston the full force of the pressure of the power fluid. This full force of the power fluid is exerted on the toggle mechanism through the last portion of its movement, which portion affords the greatest mechanical advantage. Thus the opposing half-links are pressed together with tremendous force immediately after the welding current has been cut off, so that the initial cooling of the weld takes place under very high pressure resulting in a compact union of the metal portions at the weld. This results in a weld of great and uniform strength. After the apparatus has been maintained in this condition for a sufficient period to permit sufficient cooling of the welds, the upper and lower die members are retracted from each other by suitable actuation of the control valves 50 and 55, the newly welded link is shifted from the die members, and the operating handle 66 is swung to move the frame 21 in its reverse direction so as to be ready for another approaching movement when fresh half-links have been placed in the die members.

It is evident that many modifications and changes may be made in the details of structure shown and described without departing from the spirit or scope of the invention as defined in the following claim.

We claim:

A machine of the class described, comprising a fixed frame and a movable frame shiftable thereon, die members on said frames adapted to hold half-links of chain to be welded together, power means for moving said movable frame to bring said half-links into contact, an electric welding circuit including said half-links, a pair of control switches connected in series in said circuit, one of said switches being manually operable, the other said switch being automatically operable to open when the movable frame reaches a predetermined point in its travel, and magnetic means for holding said manual switch closed when current is flowing in the circuit.

JOHN HILLYARD POWELL.
GILSON C. STAATS.